(12) United States Patent
Boland

(10) Patent No.: US 8,307,493 B2
(45) Date of Patent: Nov. 13, 2012

(54) WINDSCREEN WIPER DEVICE

(75) Inventor: Xavier Boland, Arlon (BE)

(73) Assignee: Federal-Mogul S.A., Aubange (BE)

( * ) Notice: Subject to any disclaimer, the term of this patent is extended or adjusted under 35 U.S.C. 154(b) by 320 days.

(21) Appl. No.: 12/666,558

(22) PCT Filed: Jun. 18, 2008

(86) PCT No.: PCT/EP2008/057714
§ 371 (c)(1),
(2), (4) Date: Dec. 23, 2009

(87) PCT Pub. No.: WO2009/000729
PCT Pub. Date: Dec. 31, 2008

(65) Prior Publication Data
US 2010/0170055 A1    Jul. 8, 2010

(30) Foreign Application Priority Data
Jun. 27, 2007  (EP) .................................... 07111147

(51) Int. Cl.
*A47L 1/00*        (2006.01)
(52) U.S. Cl. ................. 15/250.32; 15/250.451
(58) Field of Classification Search ............... 15/250.32, 15/250.451, 250.43, 250.44
See application file for complete search history.

(56) References Cited

U.S. PATENT DOCUMENTS

| 6,675,432 | B1 * | 1/2004 | De Block .................. 15/250.32 |
| 7,827,652 | B2 * | 11/2010 | Yang et al. ................. 15/250.32 |
| 2006/0207050 | A1 * | 9/2006 | Shanmugham et al. ... 15/250.43 |
| 2007/0113366 | A1 * | 5/2007 | Walworth et al. .......... 15/250.32 |

FOREIGN PATENT DOCUMENTS

| FR | 2871127 A | 12/2005 |
| FR | 2891227 A | 3/2007 |

* cited by examiner

*Primary Examiner* — Basil Katcheves
(74) *Attorney, Agent, or Firm* — Robert L. Stearn; Dickinson Wright, PLLC

(57) ABSTRACT

A windscreen wiper device comprising an elastic, elongated carrier element, as well as an elongated wiper blade, which can be placed in abutment with a windscreen to be wiped, which wiper blade includes at least one longitudinal groove, in which groove a longitudinal strip of the carrier element is disposed, which windscreen wiper device comprises a connecting device for an oscillating arm, wherein the oscillating arm is pivotally connected to the connecting device about a pivot axis near one end, with the special feature that the longitudinal groove has a closed circumference, wherein the connecting device is connected to the wiper blade.

11 Claims, 7 Drawing Sheets

WINDSCREEN WIPER DEVICE

BACKGROUND OF THE INVENTION

1. Technical Field

The present invention relates to a windscreen wiper device comprising an elastic, elongated carrier element, as well as an elongated wiper blade, which can be placed in abutment with a windscreen to be wiped, which wiper blade includes at least one longitudinal groove, in which groove a longitudinal strip of the carrier element is disposed, which windscreen wiper device comprises a connecting device for an oscillating arm, wherein the oscillating arm is pivotally connected to the connecting device about a pivot axis near one end.

2. Related Art

Such a windscreen wiper device is known from international (PCT-) patent publication no. WO 02/090155 in the name of the same Applicant. The prior art windscreen wiper device is in particular designed as a "yokeless" wiper device, wherein use is no longer made of several yokes pivotally connected to each other, but wherein the wiper blade is biassed by the carrier element, as a result of which it exhibits a specific curvature. In this known windscreen wiper device the wiper blade includes two opposing longitudinal grooves on its longitudinal sides, in which grooves spaced-apart longitudinal strips of the carrier element are disposed. Neighbouring ends of the longitudinal strips are interconnected by the respective connecting piece. A sometimes felt disadvantage of the windscreen wiper device as described in the above international (PCT-) patent publication is that it is too expensive.

It is an object of the invention to improve the prior art, that is to improve a windscreen wiper device known from the above international (PCT-) patent publication, wherein a low cost "yokeless" wiper device or "flat blade" is proposed.

In order to accomplish that objective, a windscreen wiper device of the kind referred to in the introduction according to the invention is characterized in that the longitudinal groove has a closed circumference, wherein the connecting device is connected to the wiper blade. Instead of two separate longitudinal strips inserted in two opposing longitudinal grooves in the wiper blade, now use is made of particularly one central groove having a closed circumference, thus forming a central channel for particularly one longitudinal strip. the connecting device is not connected to longitudinal strip (s), as in the prior art, but to the wiper blade made of an elastomer material, such as rubber.

It is noted that the invention is not restricted to use with passenger cars, but it can also be used with trains and other fast vehicles.

In one preferred embodiment of a windscreen wiper device in accordance with the invention the wiper blade comprises an elongated upper holding part and an elongated lower wiping part of a flexible material, wherein the holding part comprises the longitudinal groove and holds the wiping part, and wherein the connecting device is connected to the holding part.

Particularly, the holding part comprises downwardly extending arms, seen in cross-section, for pivotally engaging the wiping part. In other words, a mechanical articulation is realized between the holding part and the wiping part, wherein the holding part holds the wiping part allowing the wiping part to make pivotal or hingeable movements relative to the holding part during use. In use the pivotal movements of the wiping part correspond to oscillatory movements of the oscillating arm. Due to the mechanical articulation the wiping part will not have to bend to follow the oscillatory movements of the oscillating arm, so that a permanent deformation of the wiping part as a result of stress in the rubber thereof is avoided. Please note that a sometimes felt disadvantage of the windscreen wiper device as described in the above international (PCT-) patent publication is that a rubber wiping lip of the wiper blade might show a permanent deformation after several months of use, as the wiping lip has to make many oscillating movements during use, wherein the wiping lip has to bend severely. Bending the rubber of the wiping lip many times back and forth might lead to a permanent deformation of the rubber and thus to deteriorated wiping properties, with all negative consequences involved.

Experiments of the present invention have shown that the wiping part particularly comprises a wiping lip, a neck extending from the wiping lip, as well as an enlarged head extending from the neck, wherein the enlarged head is mounted into a hollow chamber defined by the arms of the holding part. Preferably, the enlarged head has a circular, elliptical, square, rectangular, rhomboid or heart-shaped cross-section. the wiping lip is placed in abutment with a windscreen to be wiped. the wiping lip, the neck and the enlarged head particularly are preferably in one piece and extend in longitudinal direction along the entire length of the wiper blade. In particular, the holding part comprise inwardly extending end parts, wherein the neck is located at least partly between the end parts, and wherein the enlarged head is located above the end parts. In other words, the enlarged head is confined in the hollow chamber, wherein the hook-shaped end parts further retain the wiping part onto the holding part. Particularly, the hollow chamber comprises a lubricant in order to allow smooth pivotal movements of the wiping part without wear. More in particular, the arms of the holding part comprise inwardly extending end parts, wherein the neck is located at least partly between the end parts, and wherein the enlarged head is located above the end parts. In other words, the enlarged head is confined in the hollow chamber, wherein the hook-shaped end parts further retain the wiping part onto the holding part. Particularly, the hollow chamber comprises a lubricant in order to allow smooth pivotal movements of the wiping part without wear.

It is noted that in the invention the holding part and the wiping part extend in longitudinal direction along the entire length of the wiper blade. In other words, the wiper blade consists of two mutually cooperating constructional elements, namely the holding part and the wiping part. the parts are preferably slidably connected to each other, wherein the enlarged head of the wiping part is slidably mounted into the hollow chamber of the holding part. the hollow chamber extends along the entire length of the wiper blade so as to form a channel with two open ends. One of the open ends of the channel forms an entrance through which the wiping part as a separate construction element can be slid by hand into the channel until the wiping part is finally retained onto the holding part (the first position). the open end also acts as an exit through which the wiping part can be slid by hand from the first position until the wiping part as a separate "loose" construction element can be replaced or repaired (the second position).

In another preferred embodiment of a windscreen wiper device according to the invention the connecting device and the holding part comprise mutually cooperating groove/protrusion means for retaining the connecting device onto the holding part. In a preferred embodiment the connecting device comprises downwardly extending arms, seen in cross-section, for engaging around longitudinal sides of the holding part that face away from each other, and wherein the arms and the holding part comprise the mutually cooperating groove/ protrusion means for retaining the connecting device onto the holding part. Particularly, each arm comprise a protrusion extending in a direction along the length of the connecting device, wherein the holding part comprises grooves extending in a direction along the length of the holding part, and wherein each protrusion engages into a corresponding groove. More in particular, the protrusion (s) extend(s) inwardly in a transversal direction. This all enhances the rigidity of the connecting device (particularly needed when the latter has a large shape in case of large shape wiper blades), as well as a minimum play between the connecting device and the holding part.

In another preferred embodiment of a windscreen wiper device in accordance with the invention the holding part comprises a protrusion extending in a direction along the length of the holding part, wherein the connecting device comprises a groove extending in a direction along the length of the connecting device, and wherein the protrusion engages into the groove. the protrusion on the holding part is preferably deformed on opposite sides of the connecting device in order to block any longitdinal movement of the connecting device once mounted on the holding part. In the alternative or in addition thereto the groove on the connecting device may be deformed as well. Particularly, the groove on the connecting device comprises a protrusion engaging into a corresponding hole in the protrusion on the holding part for further retaining the connecting device onto the holding part.

In another preferred embodiment of a windscreen wiper device according to the invention outer ends of the longitudinal groove are closed by a respective connecting piece connected to the wiper blade. Preferably the holding part comprises a protrusion extending in a direction along the length of the holding part, wherein each connecting piece comprises a groove extending in a direction along the length of the connecting piece, and wherein the protrusion engages into the groove. Likewise, the protrusion on the holding part is preferably deformed inside the connecting piece. Again, in the alternative or in addition thereto the groove on the connecting piece is deformed. Preferably, the groove on the connecting piece comprises a protrusion engaging into a corresponding hole in the protrusion on the holding part.

The invention will now be explained in more detail with reference to figures illustrated in a drawing, wherein.

Figure 1:
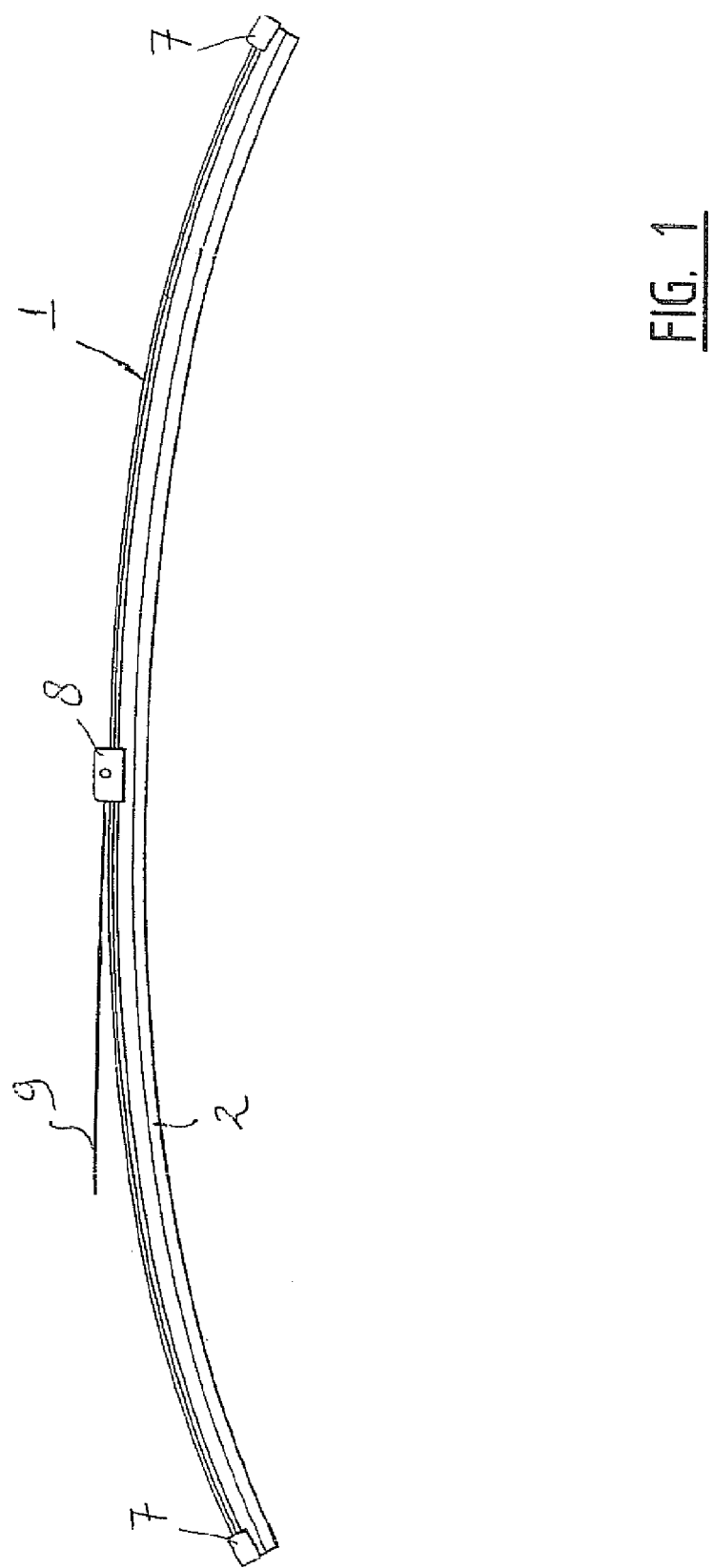
FIG. 1 shows a perspective view of a windscreen wiper device according to a preferred embodiment of the invention.
Figure 2:
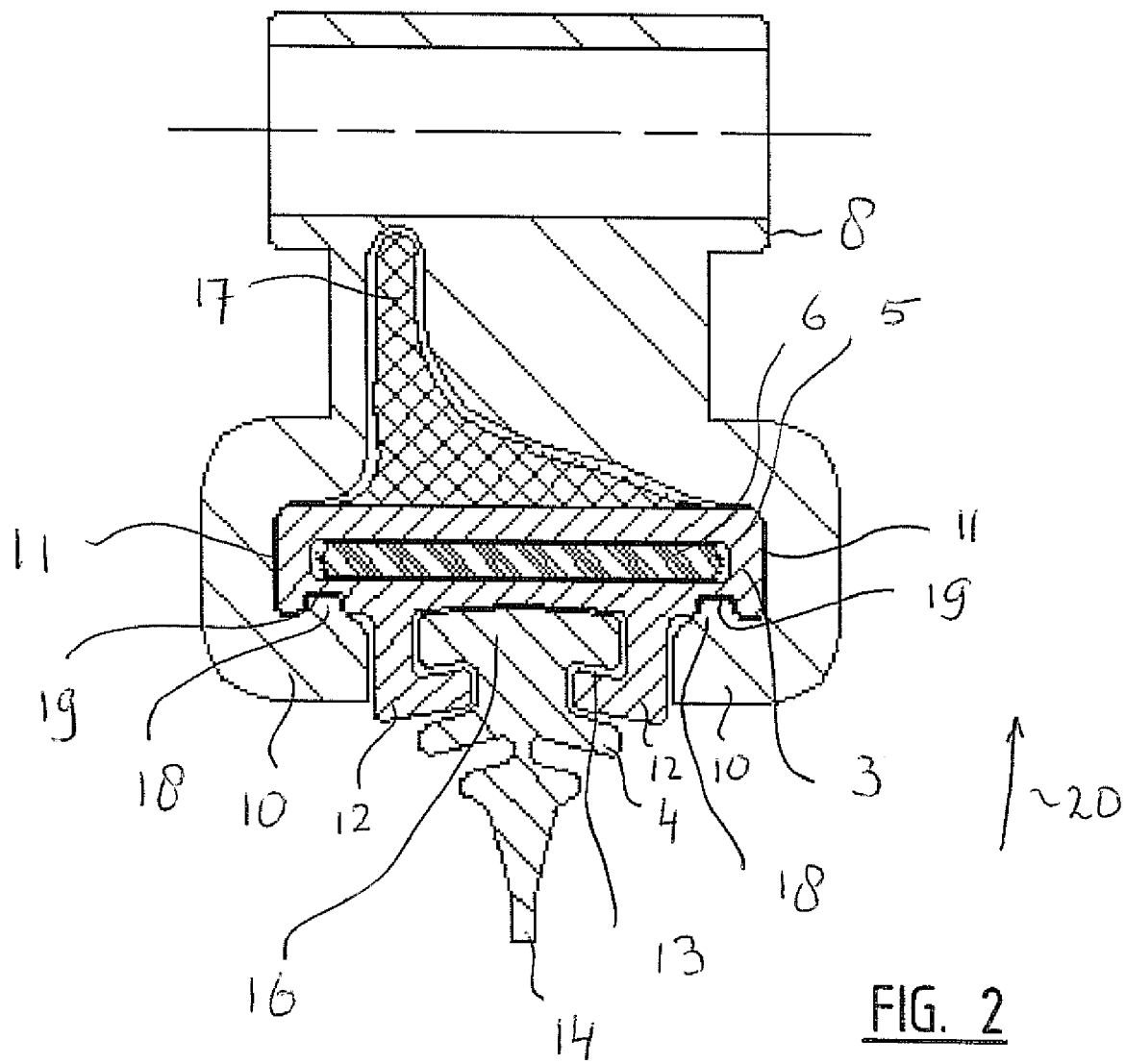
FIGS. 2 and 3 are a cross-section of the windscreen wiper device of FIG. 1 at the location of a connecting device for an oscillating arm according to a first (FIG. 2) and a second (FIG. 3) embodiment, respectively.

FIGS. 1 and 2 show a preferred variant of a windscreen wiper device 1 according to the invention. the windscreen wiper device 1 is built up of a wiper blade 2 consisting of a plastic elongated upper holding part 3 and an elastomeric elongated lower wiping part 4, both extending in longitudinal direction along the entire length of the wiper blade 2. In the holding part 3 a central longitudinal groove 5 is formed, in which a longitudinal strip 6 made of spring band steel is fitted (FIG. 2). the strip 6 forms a flexible carrier element for the rubber wiper blade 2, as it were, which is thus biased in a curved position (the curvature in operative position being that of a windscreen to be wiped) Outer ends of the wiper blade 2 are connected on either side of the windscreen wiper device 1 to connecting pieces 7.

The windscreen wiper device 1 is furthermore built up of a connecting device 8 of plastic material for an oscillating wiper arm 9 (FIG. 1). the connecting device 8 comprises clamping members 10 that are integral therewith, which engage round longitudinal sides 11 of the holding part 3 that face away from each other, as a result of which the connecting device 8 is firmly attached to the unit consisting of the holding part 3 and the strip 6. The oscillating wiper arm 9 is pivotally connected to the connecting device 8 about a pivot axis near one end thereof.

Figure 3:
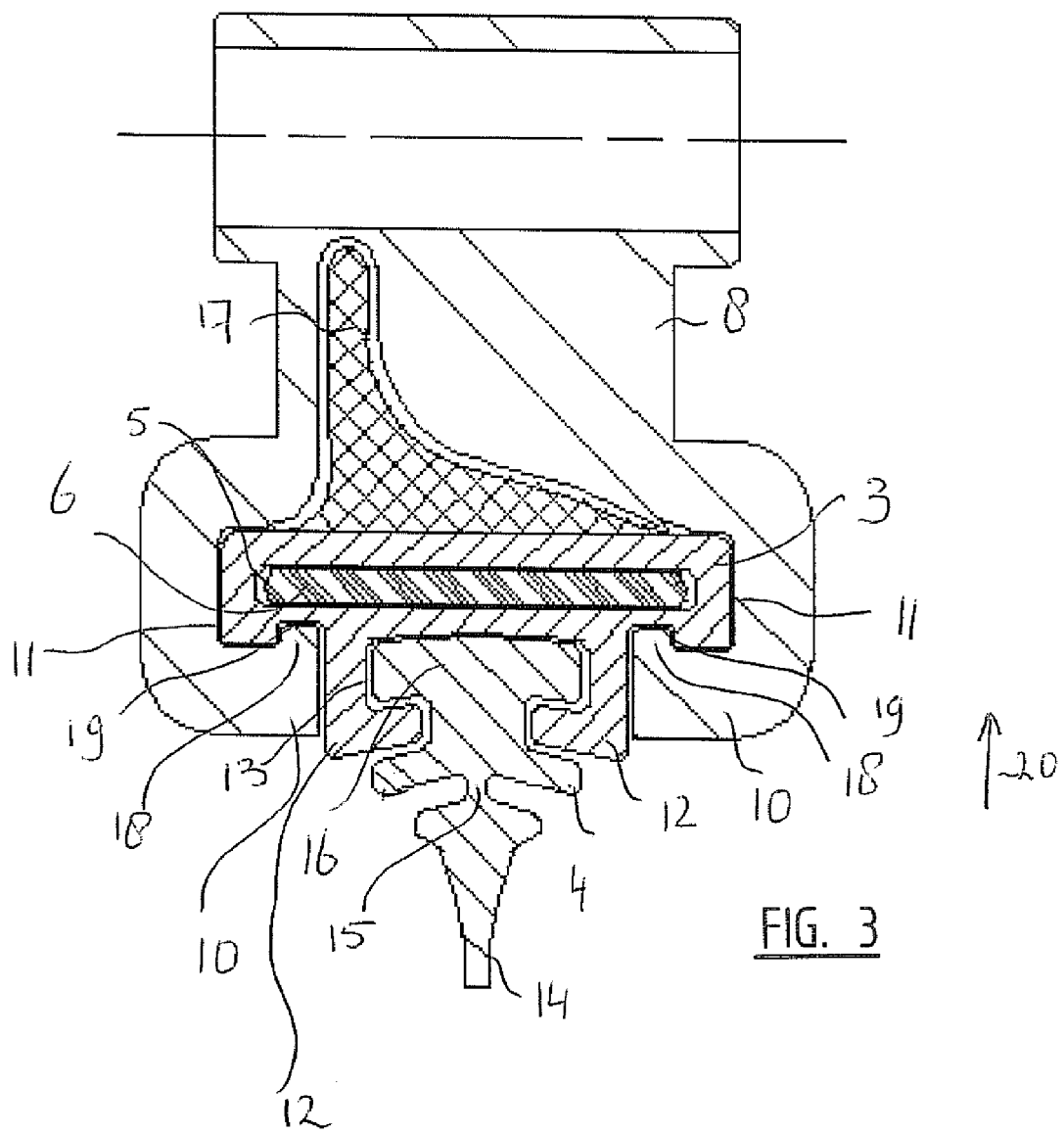

As can be seen from FIGS. 2 and 3, the holding part 3 is provided with downwardly extending arms 12 in one piece therewith, seen in cross-section, thus defining a hollow chamber or space 13, again seen in cross-section. the hollow chamber 13 extends in longitudinal direction along the entire length of the wiper blade 2, so as to form a channel with two open outer ends. Again referring to FIGS. 2 and 3, the wiping part 4 consists of a wiping lip 14, a neck 15 extending from the wiping lip 14, as well as an enlarged head 16 extending from the neck 15 and having a rectangular cross-section. the parts 3,4 are slidably connected to each other, wherein the enlarged head 16 of the wiping part 4 is slidably mounted into the hollow channel of the holding part 3. One of the open ends of the channel forms an entrance through which the wiping part 4 as a separate construction element can be slid by hand into the channel until the wiping part 4 is finally retained onto the holding part 3 (the first or holding position). the open end also acts as an exit through which the wiping part 4 can be slid by hand from the first position until the wiping part 4 as a separate "loose" construction element can be replaced or repaired (the second position). The arms 12 of the holding part 3 pivotally engage the enlarged head 16 of the wiping part 4, so as to allow a pivotal or hingeable movement of the wiping part 4 when the oscillating wiper arm 9 attached to the holding part 3 makes a corresponding oscillatory movement.

A spoiler or air deflector 17 is present either located on a side of the holding part 3 which faces away from the wiping part 4, wherein the spoiler 17 is in one piece with the holding part 3 (FIGS. 2 and 3) or attached as a detachable separate construction element thereto. A lubricant can be present in the channel 13.

With reference to FIGS. 2 and 3 showing a cross-section of the windscreen wiper device of FIG. 1 at the location of a connecting device for an oscillating arm according to a first (FIG. 2) and a second (FIG. 3) embodiment, each arm 12 has a rib-shaped protrusion 18 extending along the entire length of the connecting device 8, whereas the holding part 3 has corresponding grooves 19 extending along the entire length of the holding part 3. Each protrusion 18 engages into a corresponding groove 19. the rib-shaped protrusions 18 extend inwardly in a transversal direction indicated by an arrow 20. the protrusions 18 and correspondingly shaped grooves 19 serve as mutually cooperating groove/protrusion means for retaining the connecting device 8 onto the holding part 3.

Figure 4:
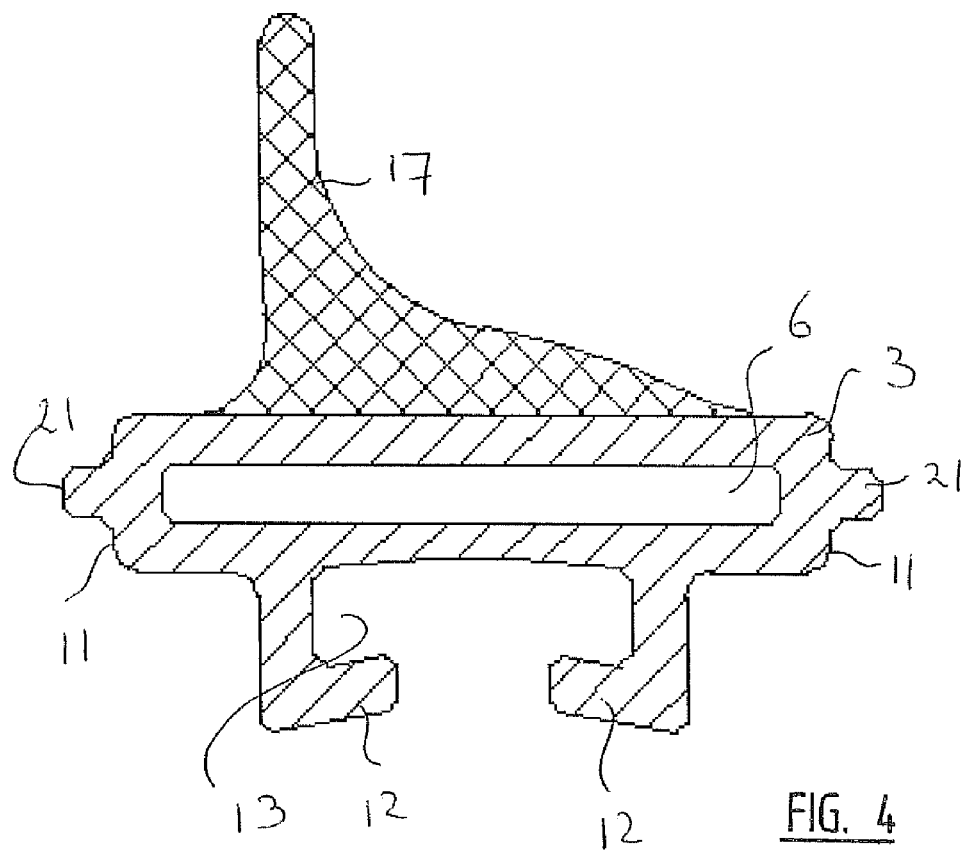
FIG. 4 is a cross-section of the windscreen wiper device of FIG. 1 at a location outside the connecting device according to a third embodiment.
Figure 5:
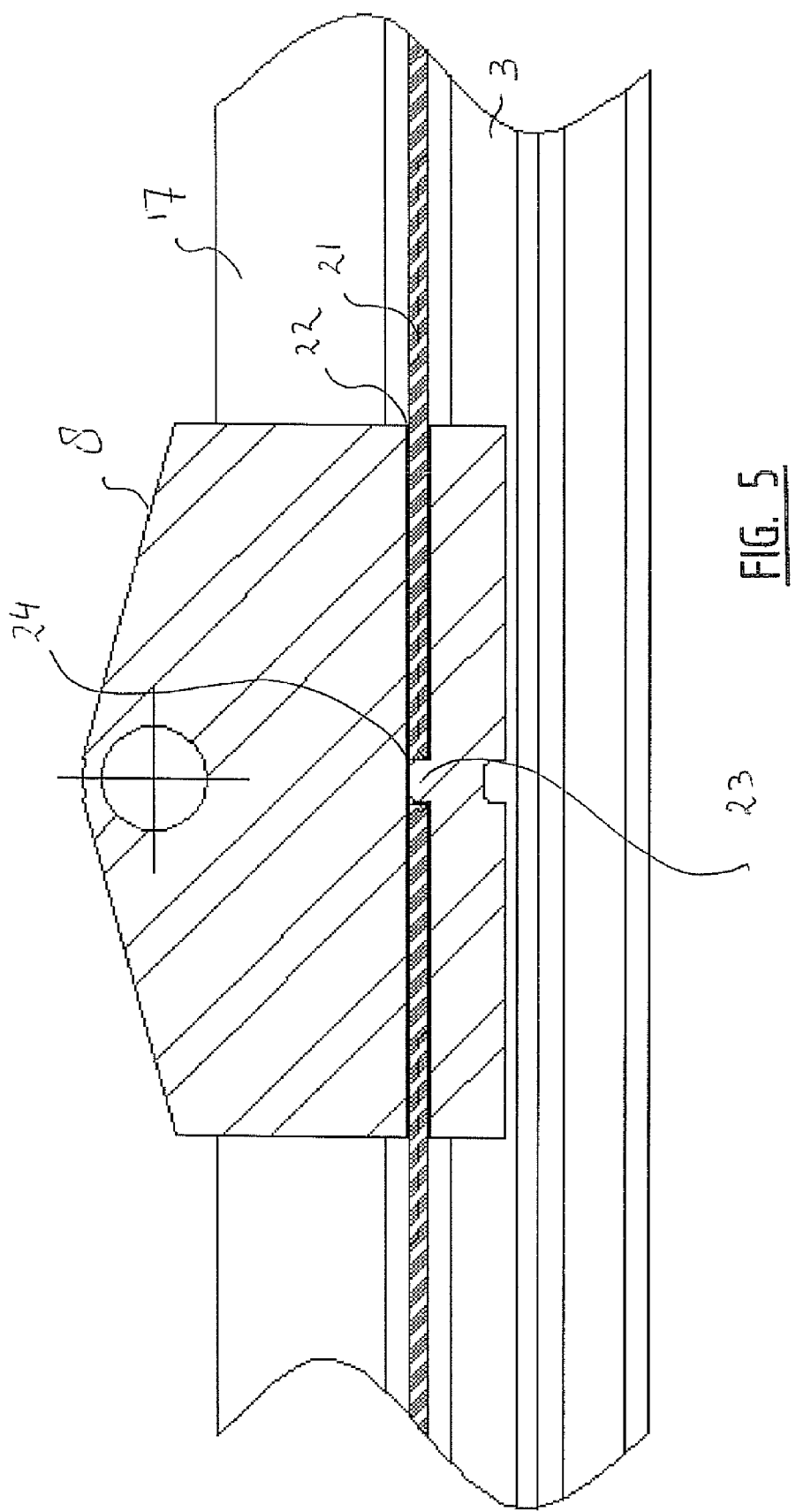
FIGS. 5 and 6 are a side-view of the windscreen wiper device of FIG. 1 at the location of the connecting device according to the third embodiment with different ways to retain the connecting device.

As can be seen from FIG. 4 showing a cross-section of the windscreen wiper device of FIG. 1 at a location outside the connecting device according to another embodiment, the holding part 3 may have a rib-shaped protrusion 21 at longitudinal sides 11 thereof and extending sidewardly along the entire length of the holding part 3. the connecting device 8 may have a correspondingly shaped groove 22 on both sides thereof and extending along the entire length of the connecting device 8, such that the rib-shaped protrusions 21 engages into the grooves 22 (FIG. 5). FIG. 5 is a side-view of the windscreen wiper device of FIG. 1 at the location of the connecting device showing that the connecting device 8 may have a protrusion 23 engaging into a correspondingly shaped hole 24 in the rib-like protrusion 21 on the holding part 3 for further retaining the connecting device 8 onto the holding part 3.

Figure 6:
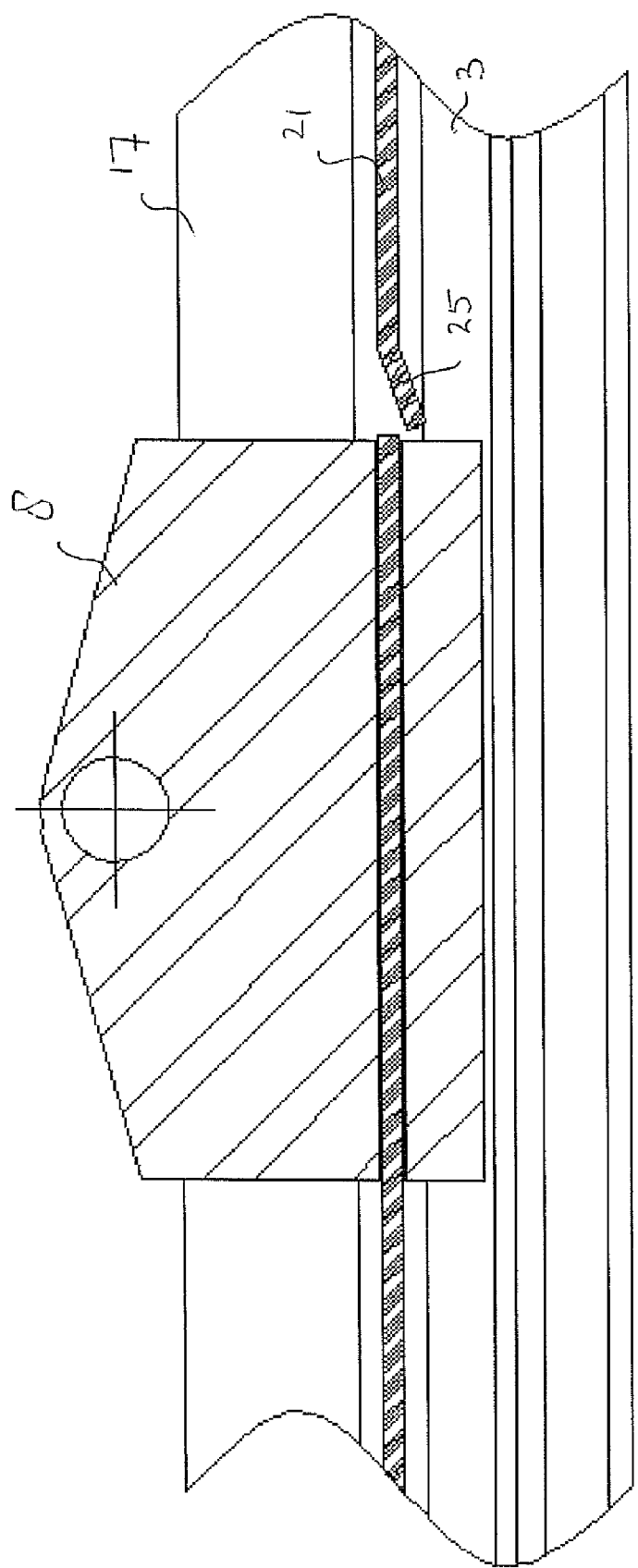

FIG. 6 corresponds to FIG. 5, but shows an alternative to the solution proposed in FIG. 5 in the sense that the rib-shaped protrusion 21 on the holding part 3 may be deformed, bend for example in downward direction, on opposite longitudinal sides of the connecting device 8 so as to block any longitudinal movement of the connecting device 8. the bending operation takes place after the connecting device 8 is mounted onto the holdig part 3 at locations indicated by 25.

Figure 7:
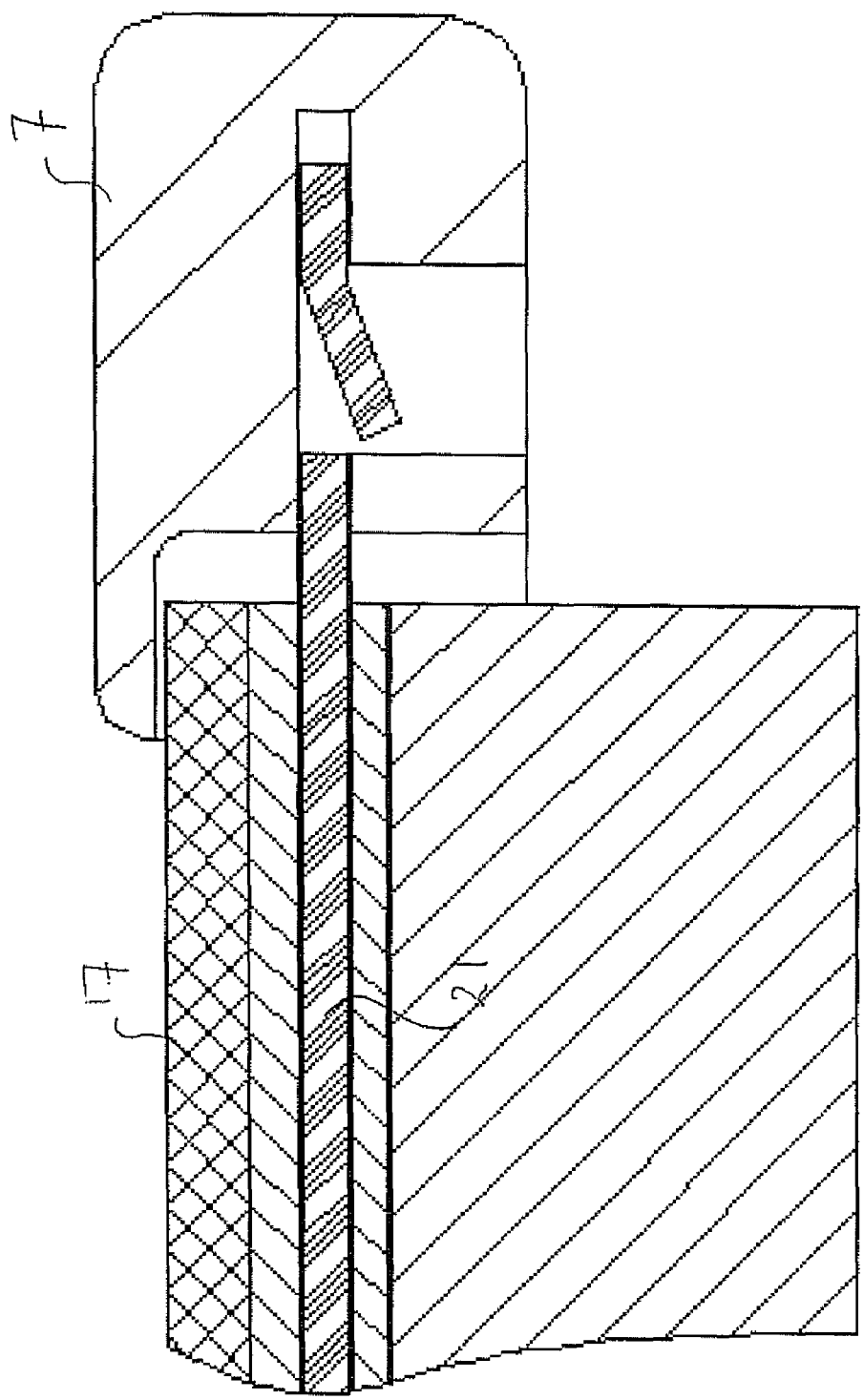
FIG. 7 is a side-view of the windscreen wiper device of FIG. 1 at the location of a connecting piece at both ends of a wiper blade thereof according to the third embodiment.

In FIG. 7 a side-view of the windscreen wiper device of FIG. 1 is shown at the location of a connecting piece 7 at both ends of a wiper blade thereof. Again, the rib-shaped protrusion 21 on the holding part 3 may be bend in downward direction at the location indicated by 25 so as to block any longitudinal movement of the connecting piece or end cap 7. the bending operation takes place after the connecting piece or end cap 7 is mounted onto the holding part 3.

Although not depicted in the figures, it will be clear for a person skilled in the art that the oscillating wiper arm 9 is connected to a mounting head fixed for rotation to a shaft driven by a small motor. In use, the shaft rotates alternately in a clockwise and in a counter-clockwise sense carrying the mounting head into rotation also, which in turn draws the oscillating wiper arm 9 into rotation and by means of the connecting device 8 moves the wiper blade 2.

The invention is not restricted to the embodiments shown, but also extends to other preferred variants falling within the scope of the appended claims. For example, a skilled person would easily understand that the central longitudinal strip 6 of FIGS. 2 and 3 could well be replaced by two longitudinal strips 6 located in correspondingly shaped grooves 5 in the holding part 3.

What is claimed is:

1. A windscreen wiper device comprising an elastic, elongated carrier element, as well as an elongated wiper blade, which can be placed in abutment with a windscreen to be wiped, which wiper blade includes at least one longitudinal groove, in which groove a longitudinal strip of the carrier element is disposed, which windscreen wiper device comprises a connecting device for an oscillating arm, wherein said longitudinal groove has a closed circumference, wherein said connecting device is connected to said wiper blade, wherein said wiper blade comprises an elongated upper holding part and an elongated lower wiping part of a flexible material, wherein said holding part comprises longitudinal sides and said longitudinal groove and holds said wiping part, wherein said connecting device comprises downwardly extending arms engaging around said longitudinal sides of said holding part, and wherein said arms or said holding part include at least one groove and the other includes at least one vertically extending projection engaging said at least one groove for retaining said connecting device onto said holding part.

2. A windscreen wiper device according to claim 1, wherein each arm includes at least one projection extending in a direction along the length of said connecting device, and wherein said holding part comprises at least two grooves extending in a direction along the length of said holding part.

3. A windscreen wiper device according to claim 2, wherein said protrusions on said holding part are deformed on opposite sides of said connecting device.

4. A windscreen wiper device according to claim 1, wherein said protrusion extend inwardly in a transversal direction.

5. A windscreen wiper device according to claim 1, wherein said groove on said connecting device is deformed.

6. A windscreen wiper device according to claim 1, wherein said connecting device comprises a protrusion engaging into a corresponding hole in said holding part.

7. A windscreen wiper device according to claim 1, wherein outer ends of said longitudinal groove are closed by a respective connecting piece connected to said wiper blade.

8. A windscreen wiper device comprising an elastic, elongated carrier element as well as an elongated wiper blade, which can be placed in abutment with a windscreen to be wiped, which wiper blade includes at least one longitudinal groove, in which groove a longitudinal strip of the carrier element is disposed, which windscreen wiper device comprises a connecting device for an oscillating arm, wherein said longitudinal groove has a closed circumference, wherein said connection device is connected to said wiper blade, wherein said wiper blade comprises an elongated upper holding part and an elongated lower wiping part of a flexible material, wherein said holding part comprises said longitudinal groove and holds said wiping part, wherein said connecting device is connected to said holding part, wherein said connecting device and said holding part comprise mutually cooperating groove/protrusion means for retaining said connecting device onto said holding part, wherein outer ends of said longitudinal groove are closed by a respective connecting piece connected to said wiper blade, and wherein said holding part comprises a protrusion extending in a direction along the length of said holding part, wherein each connecting piece comprises a groove extending in a direction along the length of said connecting piece, and wherein said protrusion engages into said groove.

9. A windscreen wiper device according to claim 8, wherein said protrusion on said holding part is deformed inside said connecting piece.

10. A windscreen wiper device according to claim 8, wherein said groove on said connecting piece is deformed.

11. A windscreen wiper device according to claim 8, wherein said groove on said connecting piece comprises a protrusion engaging into a corresponding hole in said protrusion on said holding part.

* * * * *